United States Patent [19]

Doi et al.

[11] Patent Number: 4,700,324
[45] Date of Patent: Oct. 13, 1987

[54] DIGITAL CIRCUIT PERFORMING AN ARITHMETIC OPERATION WITH AN OVERFLOW

[75] Inventors: Kohji Doi; Yuichi Kawakami, both of Tokyo, Japan

[73] Assignee: NEC Corporation, Tokyo, Japan

[21] Appl. No.: 647,507

[22] Filed: Sep. 5, 1984

[51] Int. Cl.$^4$ .................................................. G06F 7/38
[52] U.S. Cl. ...................................... 364/745; 364/728
[58] Field of Search .......................... 364/745, 736, 728

[56] References Cited

U.S. PATENT DOCUMENTS

| | | | |
|---|---|---|---|
| 4,282,581 | 8/1981 | Bondurant et al. | 364/745 |
| 4,338,675 | 7/1982 | Palmer et al. | 364/745 |
| 4,393,468 | 7/1983 | New | 364/736 |
| 4,467,444 | 8/1984 | Harmon, Jr. et al. | 364/736 |

OTHER PUBLICATIONS

IEEE Journal of Solid-State Circuits, vol. SC-16, No. 4, Aug. 1981, "A Single-Chip Digital Signal Processor for Telecommunication Applications", T. Nishitani et al.

Primary Examiner—Archie E. Williams, Jr.
Assistant Examiner—Dale M. Shaw
Attorney, Agent, or Firm—Sughrue, Mion, Zinn, Macpeak & Seas

[57] ABSTRACT

A digital circuit for executing an arithmetic operation includes an overflow processing capability. The overflow processing is performed by a shifter to correct a decimal point. The shifter is used to shift a result of the arithmetic operation with an overflow and to shift a data to be operated by an arithmetic unit. The result and the data are applied to the shifter via a multiplexer, and either one of them is transferred to the shifter. The shifter is controlled such that the result of the arithmetic operation is shifted by one bit, while the data is shifted according to the number of overflows. As the result, the digital circuit can perform an arithmetic operation at a high speed by means of a simple hardware element.

6 Claims, 7 Drawing Figures

SIGN BIT — A DECIMAL POINT

BEFORE CORRECTION

AFTER CORRECTION

DIGITAL CIRCUIT PERFORMING AN ARITHMETIC OPERATION WITH AN OVERFLOW

FIELD OF THE INVENTION

The present invention relates to a digital circuit, and more particularly to a computing circuit employed in a digital processor to perform an arithmetic operation with an overflow which arises in an addition or a subtraction.

DESCRIPTION OF THE PRIOR ART

Progress in a semiconductor device manufacturing techniques has made large scale integrated (LSI) circuit possible. The LSI circuit has been recently used in a digital signal processor. The digital signal processor has been developed to manipulate analog signals in the form of digital signals, and can be applied to sound processing, a image processing, a telecommunication, or the like. These processings particularly require a high-speed real time processing, and substantially involves a large number of digital calculations. For example, in a filter operation or an orthogonal transformation such as Fourier transformation, a matrix operation or a multiply-add operation is necessary. Thus, the digital signal processing must continously execute add operations or subtraction operations over a long period of time.

On the other hand, since real time processing is required in the digital signal processing as described above, a hardware circuit is desired to perform the add operation or the subtraction operation at a high speed. However, an overflow necessarily occurs in such addition or subtraction. When the overflow occurs, the result of the addition or the subtraction must be quickly corrected before the subsequent addition or subtraction. It is a very important factor that the overflow processing is performed as fast as possible in a high-speed digital signal processing.

The overflow processing necessitates a bit shift operation to correct the result. That is, when the overflow occurs in positive (plus) side, the result is shifted in the right direction, while the result is shifted in the left direction when the overflow occurs in negative (minus) side. The latter case may be called the underflow. In the present invention, the word of "overflow" is used to include both the overflow and the underflow.

Now, it is assumed that in multiply-add operation a plurality of data produced by a multiply operation are sequentially added to each other and that the sum total is required. The overflow processing in the prior art digital signal processor is performed by the arithmetic circuit as shown in FIG. 1 of IEEE Journal of Solid-State Circuits, vol. SC-16, No. 4, August 1981 "A Single-Chip Digital Signal Processor for Telecommunication Applications" T. NISHITANI et al. The circuit includes a multiplier, an arithmetic logic unit (ALU), two accumulators (Acc A and Acc B), a multiplexer and a shifter. The overflow processing sequence is as follows:

step 1—When the ALU is to execute addition it generates a carry signal to designate the overflow, a result of addition set in the Acc A is shifted by one bit in the right direction by the shifter.

step 2—The shifted result is stored in another Acc B, and the Acc A is cleared.

step 3—A data to be added at the next timing is added to the content of the Acc A (that is, zero), and the result is set in the Acc A.

step 4—The result now set in the Acc A is shifted by one bit in the right direction by the shifter, and the shifter result is set in the Acc A.

step 5—The content of the Acc A is added to the content of the Acc B, and the result is set in the Acc A. At this time, if the overflow does not occur, the result of the Acc A is stored in the Acc B and thereafter the Acc A is cleared. The next processing is returned to the step 3. If the overflow occurs at that time, the result of the Acc A is further shifted by one bit in the right direction by using the shifter and the shifted result is stored in the Acc B. The next processing is returned to the step 3.

In the prior art digital circuit for performing the above described arithmetic operation, at least five steps (step 1 through 5) are required to execute an addition with the overflow. Further, these steps must be repeated in every adding operation after an overflow occurs. Further, since a data transferring operation from the Acc A to the Acc B is required, the control circuit has to execute a complex timing control. Moreover, three outputs of the multiplier, the shifter and the Acc B must be selected, and therefore a complex selecting processing is required. In addition, at least two Accs are also required. As the result, an arithmetic operation according to the prior art needs a long period of time, and a complex hardware logic element is required.

SUMMARY OF THE INVENTION

An object of the present invention is to provide a digital circuit which can perform an arithmetic operation with overflow at a high speed.

Another object of the present invention is to provide a digital circuit having a simple hardware circuitry for performing an overflow processing according to a novel architecture.

Still another object of the present invention is to provide a digital arithmetic circuit which can execute an addition or a subtraction having an overflow through a small number of processing steps.

A digital circuit according to the present invention comprises an arithmetic unit for executing an arithmetic operation, an input circuit for applying a data to be calculated to the arithmetic unit, a register coupled to the arithmetic unit for storing an output of the arithmetic unit, a multiplexer coupled to the input circuit and the register, a shifter coupled between the multiplexer and the arithmetic unit, a shift control register coupled to the shifter for applying a data indicating a number of bits to be shifted to the shifter, and a control circuit coupled to the arithmetic unit, the shifter, and the shift control register. The arithmetic unit generates a signal indicating occurrence of an overflow and applies it to the control circuit. In response to the signal, the control circuit transfers a data indicating one-bit shift to the shifter and increments the shift control register by one. The shifter receives the data from the control circuit and shifts an output of the register which is selected by the multiplexer by one bit. The shifted data is set in the register. At the next timing, the multiplexer selects an output of the input circuit. The output is shifted by the shifter according to a content of the shift control register and is calculated with the content of the register by the arithmetic unit.

According to the present invention, the shifter is positioned between the multiplexer and the arithmetic unit and is controlled by the control circuit and the shift control register. The control circuit directly controls the shifter only when a signal indicating an overflow is generated, and increments a content of the shift control register. A content of the shift control register is applied to the shifter when the signal is absent. Namely, the shifter executes a one-bit shift operation whenever an overflow occurs, thus a content of the register is corrected. While, the shifter executes a shift operation according to a content of the shift control register when an overflow does not occur, thus an output of the input circuit is automatically shifted, and a decimal point of the output is adjusted to that of the content of the register.

As described above, the processing for transferring a data of the Acc A to the Acc B in the step 2 of the prior art is not necessary. Further, the processing for adding the data of the Acc A to the data of the Acc B in the step 5 is also unnecessary. Therefore, an overflow processing can be simplified as compared with the prior art, thus a high-speed processing can be obtained by the present invention.

Further, a register for storing a result of the arithmetic operation may be only one. Therefore, complex hardware elements such as the prior art is not required in the present invention.

Moreover, since the multiplexer may select one of the only two outputs from the input circuit and the register, its control is very easy. With respect to the shift control register, it may be incremented by a signal indicating an overflow, so that no complex control is required.

DETAILED DESCRIPTION OF THE PRIOR ART

Figure 1:
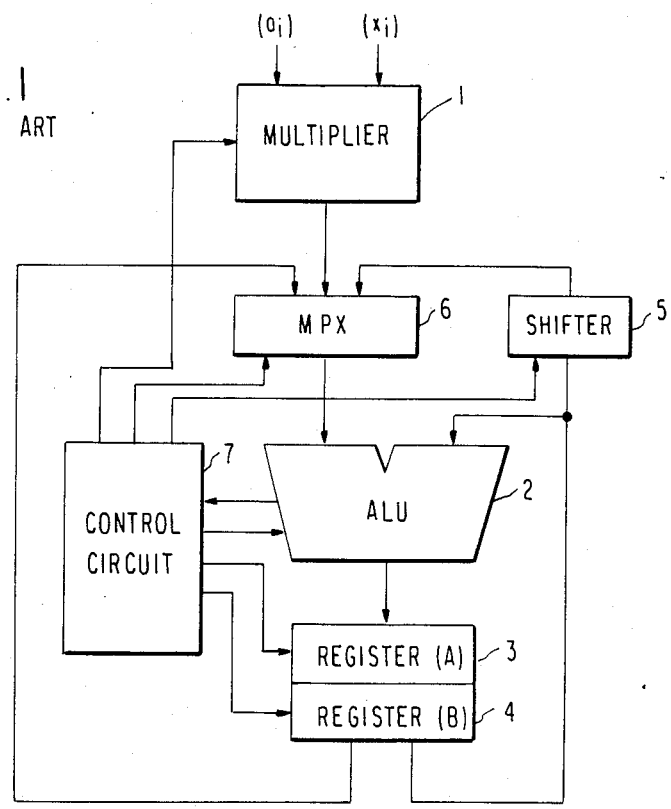
FIG. 1 is a block diagram of a digital circuit having an arithmetic function according to the prior art.

FIG. 1 is a block diagram of a digital circuit for performing the multiply-add operation according to the prior art. For example, the following expression can be calculated by the digital circuit of FIG. 1:

$$Y = \sum_{i=1}^{N} a_i \cdot X_i \quad (1)$$

$$(i = 1, 2, 3, \ldots, N)$$

The multiplication $(a_i \cdot X_i)$ is executed by a multiplier 1, and the addition ($\Sigma$) is executed by an arithmetic unit (ALU)2 having an adding function. Further, two registers (registers (A)3 and (B)4), a shifter 5 and a multiplexer 6 are employed therein. The shifter 5 receives an output from the register (A)3 and transfers a shifted data to the multiplexer 6. The multiplexer 6 receives an output from the multiplier 1 and an output from the register (B)4 in addition to the output from the shifter 5. The ALU2 receives a data selected by the multiplexer 6 at one input portion and a data from the register (A)3 at another input portion. These elements control their timings by a control circuit 7 to which a carry signal for indicating an overflow is applied from the ALU2. A multiplicand (such as a coefficient) $a_i$ and a multiplier $X_i$ are applied to the multiplier 1 as a time series data.

Figure 2:
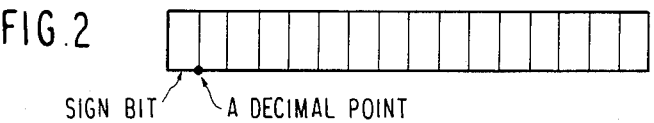
FIG. 2 shows a data format of a fixed-point representation.

Now, it is assumed that the ALU2 executes a fixed-point arithmetic. The fixed-point representation is shown in FIG. 2. That is, the most significant bit (MSB) is a sign bit, and the following bits are numeric bit data. A decimal point (a hypothetical binary point) is located between the MSB and the second bit as shown in FIG. 2.

Figure 3:
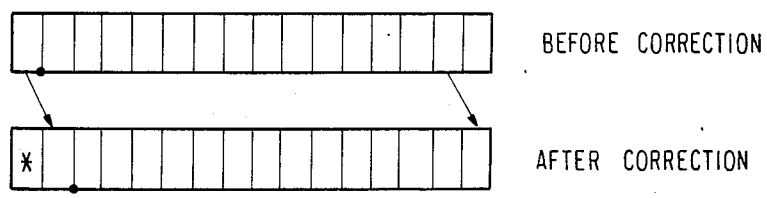
FIG. 3 shows data formats according to an overflow processing.

Now, when an overflow occurs in an addition, the overflow processing is performmd as follows:

(I) A result of the addition is shifted by one bit in the right direction as shown in FIG. 3. Thus the result of the addition is normalized. In FIG. 3, * means "1" when the overflow occurs in the positive side or "0" when the overflow occurs in the negative side.

(II) After (I), a result of a next new addition is shifted by one bit in the right direction the same as (I) in order to adjust the position even if the decimal point if the overflow does not occur in the abovementioned next new addition.

Figure 4:
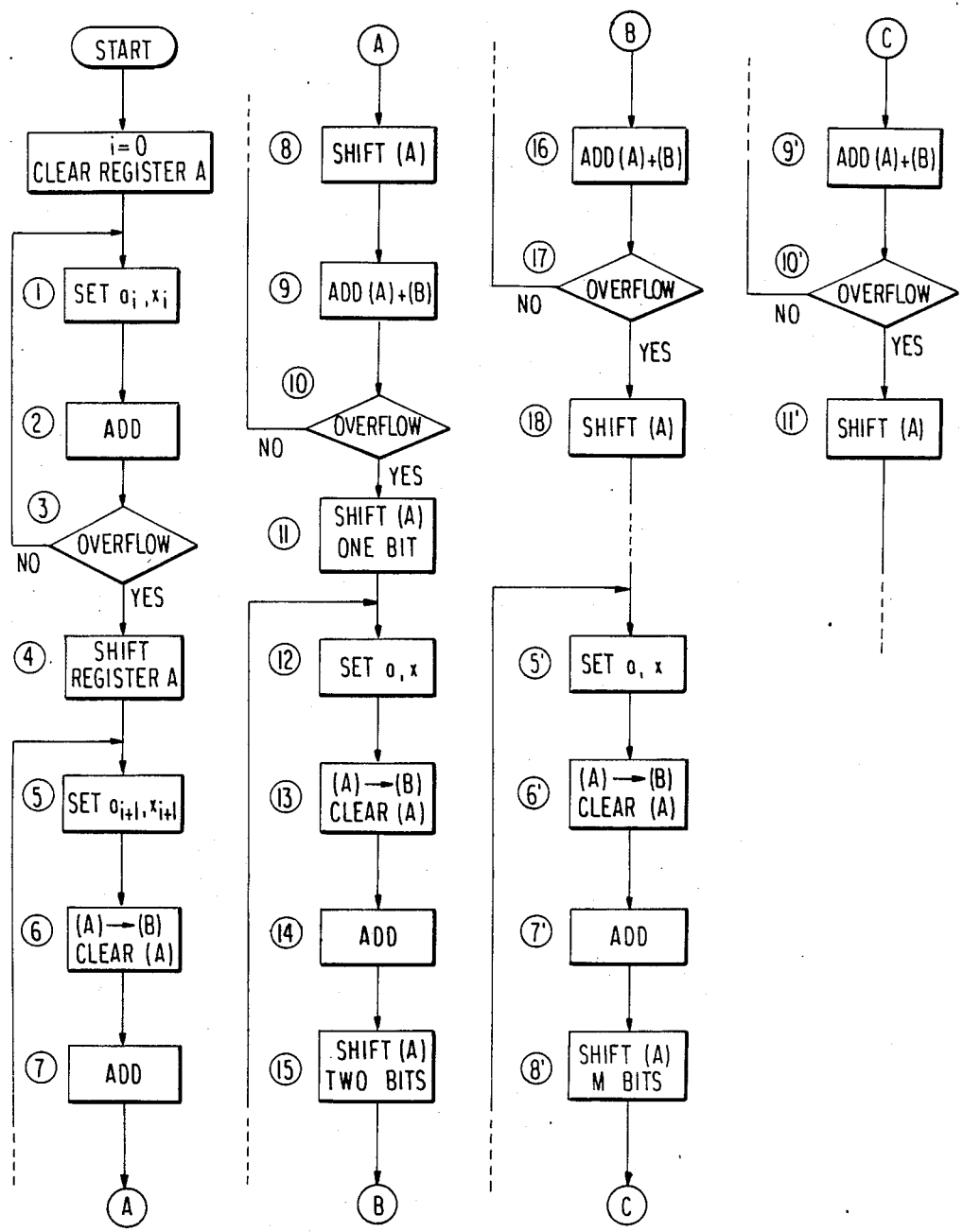
FIG. 4 is a flow chart of an arithmetic operation in the prior art digital circuit of FIG. 1.

Referring to FIG. 4 indicating a flow chart, the arithmetic sequence of the expression (1) will be explained. At the start, registers (A) and (B) are cleared and i=0.

step ①; $X_0$ and $a_0$ are set to the multiplier 1 and are multiplied.

step ②; Content (now zero) of the register (A)3 is added to an output of the multiplier 2 and a result is set in the register (A)3.

step ③; The control circuit 7 detects an occurence of an overflow by checking a carry signal of the ALU2. If the carry signal is absent, the processing returns to the step ①, and a result of $a_1 \cdot X_1$ is selected by the multiplexer 6. If the carry signal is present in $a_0 \cdot X_0 + a_1 \cdot X_1 + \ldots a_i \cdot X_i$, the processing goes to a step ④.

step ④; A content of the register (A)3 is shifted by one bit in the right direction by using the shifter 5. The processing goes to a step ⑤.

step ⑤; $a_{i+1}$ and $X_{i+1}$ is set to the mulitplier 2.

step ⑥; The content, which is obtained by the step 4, of the register (A)3 is shifted to the register (B)4, and the register (A)3 is cleared to zero.

step ⑦; The content (zero) of the register (A)3 is added to an output $(a_{i+1} \cdot X_{i+1})$ of the multiplier 1, and the result $(a_{i+1} \cdot X_{i+1})$ is set to the register (A)3.

step ⑧; The content $(a_{i+1} \cdot X_{i+1})$ of the register (A)3 is shifted by one bit in the right direction.

step ⑨; The content of the register (A)3 is added to the content of the register (B)4, thus $a_0 \cdot X_0 + a_1 \cdot X_1 + \ldots + a_i \cdot X_i + a_{i+1} \cdot X_{i+1}$ is performed. The result is set to the register (A)3.

step ⑩; The control circuit 7 checks whether a carry signal is generated or not in the step ⑨. If the carry signal is absent, then the processing returns to the step ⑤. If the carry signal is present, then the processing goes to a step ⑪.

step ⑪; The content of the register (A)3 is shifted by one bit in the right direction.

step ⑫; Next new data $a_{i+m}$ and $X_{i+m}$ to be multiplied are set in the multiplier 1.

step ⑬; The content of the register (A)3 is shifted to the register (B)4 and is cleared to zero.

step ⑭; The output $(a_{i+m} \cdot X_{i+m})$ from the multiplier ① is added to the content (zero) of the register (A)3, and the result is set in the register (A)3.

step ⑮; The content of the register (A)3 is shifted by two bits.

step ⑯; The content of the register (A)3 is added to the content of the register (B)4, and the result is set to the register (A)3.

step ⑰; The control circuit 7 checks whether a carry signal is generated or not from the ALU2 in the step ⑯. If the carry signal is absent, a next processing returns to the step ⑫, while if the carry signal is present, the next processing goes to step ⑱.

step ⑱; The content of the register (A)3 is shifted by one bit in the right direction. A subsequent processing flow is the same as the steps ⑤ through ⑩.

Here, a shift operation in the step ⑧ depends on the number of occurrences of an overflow. That is, two bits are shifted in the step ⑮ when an overflow has occurred two times. On the other hand, in the case of the step ⑧' after an overflow has occurred M times, M bits must be shifted.

As mentioned above, according to the prior art digital circuit, the arithmetic operation includes a large number of processing steps. Particularly, the processing for transferring a content of the register (A)3 to the register (B)4 in the step ⑥, the processing for adding a content of the register (A) to a content of the register (B)4 in the step ⑨, and the processing for detecting an overflow of the step ⑨ in the step ⑩ are required in every adding operation after the first overflow occurs in the step ③. Therefore, a high-speed arithmetic operation can not be performed by the prior art digital circuit. Further, two different processings must be prepared according to a result of the overflow detection; one is the processing to return to the step ⑤, and the other is the processing to go to the step ⑪. Moreover, at least two registers 3 and 4 are required for the overflow processing.

DETAILED DESCRIPTION OF AN EMBODIMENT OF THE PRESENT INVENTION

Figure 5:
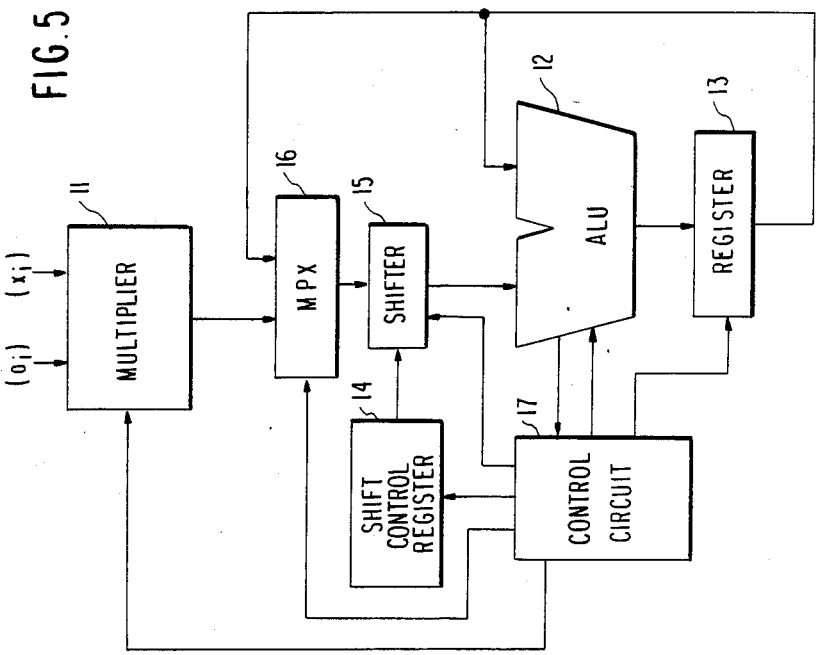
FIG. 5 is a block diagram of a digital circuit according to an embodiment of the present invention.
Figure 7:
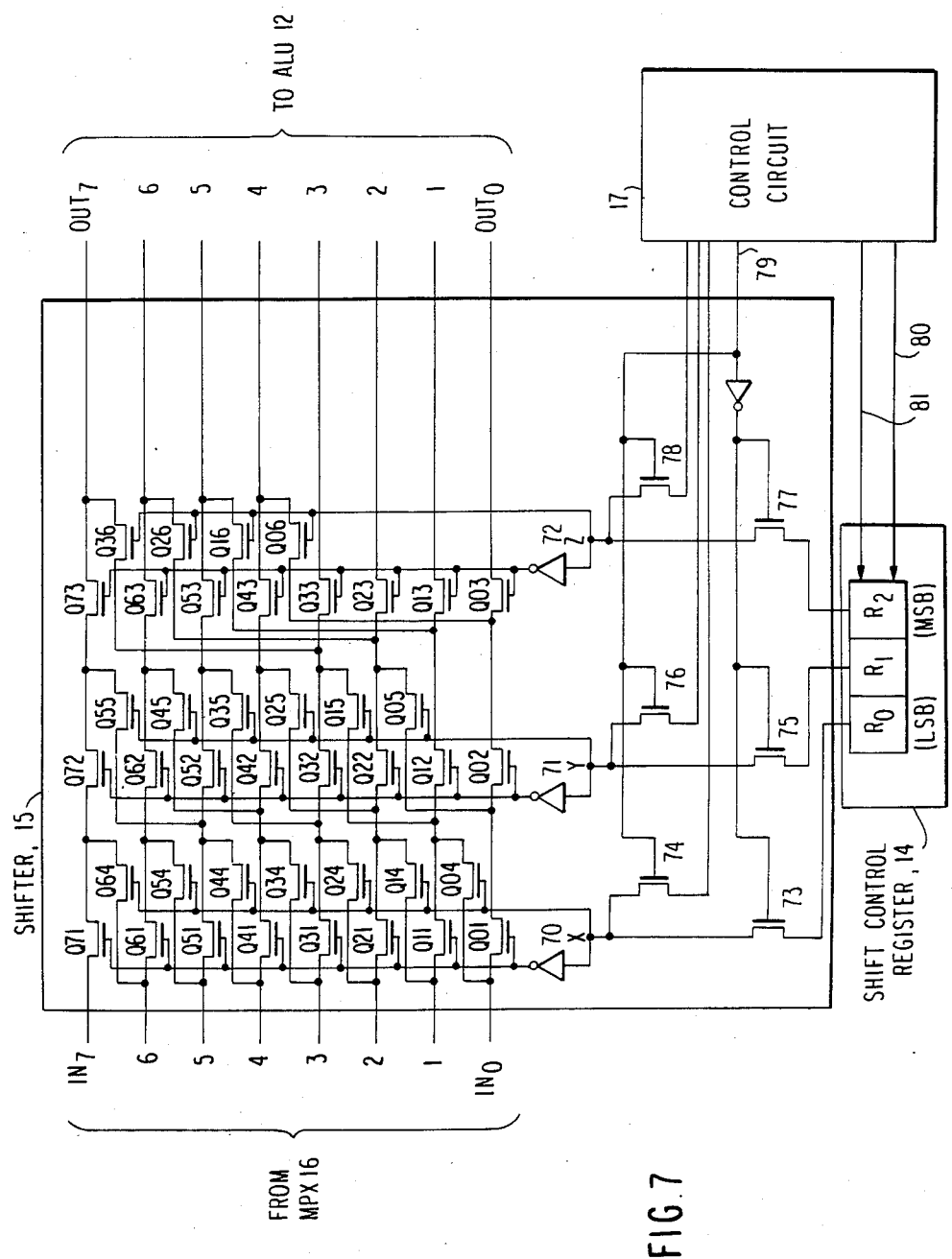
FIG. 7 is a detailed circuit diagram of a shifter and a shift control register of FIG. 5.

FIG. 5 is a block diagram of one embodiment of a digital circuit according to the present invention. The proposed digital circuit includes a multiplier 11, an arithmetic logic unit (ALU)12, a register 13, a shift control register 14, a shifter 15, a multiplexer 16 and a control circuit 17. The multiplier 11 and the ALU12 may be used the same as that of FIG. 1. An output from the ALU12 is set to the register 13 and an output from the register 13 is transferred to one input end of the ALU12 and to the multiplexer 16. The multiplexer 16 receives two outputs from the multiplier 11 and the register 13. An output of the multiplexer 16 is set to the shifter 15 whose output is transferred to the other input end of the ALU12. The shift control register 14 is employed to designate the number of bits to be shifted, and has the function to store the data indicating the number of bits to be shifted. This data is incremented by one every time an overflow occurs. In the preferred embodiment, the increment operation is executed in response to a carry signal generated from the ALU12.

The features of the digital circuit in FIG. 5 are as follows:

1. The shift control register 14 is provided;
2. The shifter 15 is positioned between the multiplexer 16 and the ALU12; and
3. Only one register 13 is coupled to an output end of the ALU12.

About the arithmetic operation for the expression 1 mentioned before, the processing flow according to this embodiment of FIG. 5 will be described in below with reference to FIG. 6.

At first the register 13 and the shift control register 14 are cleared to zero.

step ①; $a_0$ and $X_0$ to be multiplied are set in the multiplier 11.

step ②; A result $(a_0 \cdot X_0)$ of the multiplication is set to the shifter through the multiplexer 16, and is shifted in the right direction according to the data of the shift control register 14. Here, no bit is shifted.

step ③; A content (zero in the first operation) of the register 13 is added to the output of the shifter 14, and the result $(a_0 \cdot X_0)$ is set to the register 13.

step ④; The control circuit 17 checks existence of a carry signal generated from the ALU12. If the carry signal is absent, a next processing returns to the step ①. Steps ①→②→③→④→① are repeated until the carry signal is generated. When the carry signal is present at the addition of $a_0 \cdot X_0 + a_1 \cdot X_1 + \ldots + a_i \cdot X_i$, a next processing goes to a step ⑤.

step ⑤; A content of the register 13 is shifted by one bit in the right direction by the shifter 15, and the shifted data is set to the register 13. This shift operation is controlled by the control circuit 17.

step ⑥; A content of the shift control register 14 is incremented by one. A next processing returns to the step ①.

According to the embodiment, when no overflow occurs steps ① through ④ are repeated, while when an overflow occurs, steps ① through ⑥ are sequentially executed. As described above, since the shifter 15 is provided between the multiplexer 16 and the ALU12, the shift operation for adjusting a decimal point in an output of the multiplier 11 to that of the data set in the register 13 is performed before the adding operation in the ALU12. Therefore, a data transmission from the register (A) to the register (B) in the step ⑥ of FIG. 4 is not necessary. In addition, an adding operation in the step ⑨ of FIG. 4 is also unnecessary. Particularly, by the architecture of the present invention, an output of the multiplier 11 is preliminarily shifted according to a content of the shift control register 14 in which the data indicating the number of overflows is set, and thereafter a sum total is calculated by the ALU12. Therefore, an arithmetic operation can be performed at a high speed with a small number of steps. Therefore, the digital circuit of the present invention is very useful for a digital signal processing wherein a real time processing is required.

Further, the function of the control circuit 17 can be simplified by the present invention. Particularly, the control for the multiplexer 16 can be simplified. Namely, in the prior art shown in FIG. 1, the control circuit 7 must select a data among three outputs, that is an output of the multiplexer 1, an output of the register 4, and an output of the shifter 5. In contrast, the control circuit 17 in FIG. 5 may select either an output of the multiplier 11 or an output of the register 13. Moreover, the selection depends on the occurrence of an overflow. The output of the multiplier 11 is selected at the timing when a carry signal is absent, while the output of the register 13 is selected at the timing when a carry signal is present. Therefore, the control circuit 17 may generate a selecting signal in response to the carry signal from the ALU12.

Figure 6:
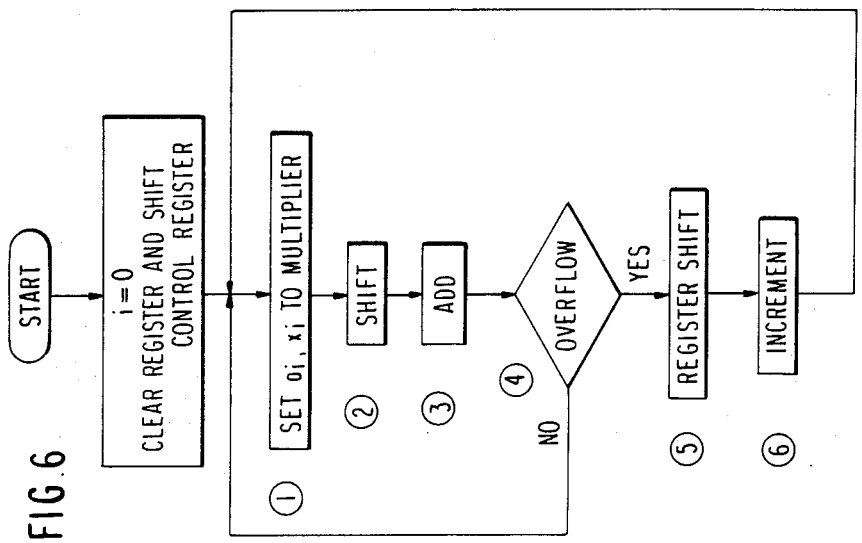
FIG. 6 is flow chart of an arithmetic operation of FIG. 5.

A more detailed circuit diagram of the shifter 15 and the shift control register 14 in FIG. 5 is indicated in FIG. 6. Here, a barrel-shifter is used as the shifter 15. An input portion of the shifter 16 is coupled to the multiplexer 16, and an output portion is coupled to the ALU12. In this example, 8-bit data ($IN_0$ to $IN_7$ and $OUT_0$ to $OUT_7$) is manipulated. Each input end is coupled to the corresponding output ends via first to third MOS transistors ($Q_{01}$, $Q_{02}$, $Q_{03}$, $Q_{11}$, $Q_{12}$, $Q_{13}$, ..., $Q_{71}$, $Q_{72}$, $Q_{73}$), respectively. Further, each input end is coupled to an input of the second MOS transistor of the adjacent input end via a fourth MOS transistor ($Q_{04}$, $Q_{14}$, $Q_{24}$, ..., $Q_{64}$), respectively. Each output of the first MOS transistors $Q_{01}$, $Q_{11}$, ..., $Q_{51}$ are coupled to each input of the third MOS transistors $Q_{23}$, $Q_{33}$, $Q_{43}$ ... $Q_{73}$ via fifth MOS transistors $Q_{05}$, $Q_{15}$, ..., $Q_{55}$, respectively. Each output of the second MOS transistors $Q_{02}$, $Q_{12}$, ..., $Q_{32}$ is coupled to each output of the third MOS transistors $Q_{43}$, $Q_{53}$, $Q_{63}$ and $Q_{73}$ via a sixth MOS transistors $Q_{06}$, $Q_{16}$, $Q_{26}$ and $Q_{36}$, respectively. Each gate of the first MOS transistors $Q_{01}$, $Q_{11}$ ... $Q_{71}$ is coupled to a node X via an inverter 70 in common, while each gate of the fourth MOS transistors $Q_{04}$, $Q_{14}$ ..., $Q_{64}$ is commonly coupled to the node X, directly. Each gate of the second MOS transistors $Q_{02}$, $Q_{12}$, ... $Q_{72}$ is coupled to a node Y via an inverter 71 in common, while gates of the fifth MOS transistors are commonly coupled to the node Y, directly. Gates of the third MOS transistors are coupled to a node Z via an inverter 72, while gates of the sixth MOS transistors are directly coupled to the node Z. These nodes X, Y and Z are coupled to the shift control register 14 and to the control circuit 17 through switching transistors 73 to 78, respectively. The switching transistors 74, 76 and 78 are activated in response to a shift switching signal 79 produced by the control circuit 17. The remainder switching transistors 73, 75 and 77 are activated in response to the inverted shift switching signal 79. The shift control register 14 has a 3-bit counter ($R_0$, $R_1$, $R_2$) and is incremented by an increment signal 80 generated from the control circuit 17 according to a carry signal of the ALU. A clear signal 81 of the control circuit 17 is used to clear the shift control register 14 to zero.

At the initial condition, the shift switching signal 79 is "0", and the shift control register 14 is cleared. Therefore, the switching transistors 73, 75 and 77 are activated, while the switching transistors 74, 76 and 78 are deactivated. At this condition, the inverters 70, 71 and 72 output "1" level signals, thus each input end $IN_0$ to $IN_7$ is electrically coupled to the corresponding output end $OUT_0$ to $OUT_7$, respectively, since the first, second and third MOS transistors are turned on. That is, no shift operation is performed in the shifter 16. However, when a carry signal is applied to the control circuit 17 from the ALU12, the control circuit 17 changes the shift switching signal 79 to "1", so that the shift control register 14 is decoupled from the nodes X, Y and Z, while the control circuit 17 is coupled to these nodes. The control circuit 17 applies "100" to these nodes X, Y and Z, respectively, and applies the increment signal 80 to the shift control register 14. As a result, an output of the multiplexer 16, that is an output of the register 13, is shifted by one bit in the right direction by the shifter 16. In addition, the shift control register 14 is set to 1. These operations are executed in the steps ⑤ and ⑥ in FIG. 6. Thereafter, the control circuit 17 changes the shift switching signal to "0" so that the shift control register is coupled to the nodes X, Y and Z. At this timing, since only $R_0$ is "1", the further MOS transistors $Q_{04}$, $Q_{14}$ ... $Q_{64}$ are turned on. On the other hand, $R_1$ and $R_2$ are both "0", and therefore the second and third MOS transistors are turned on. As a result, an output of the multiplexer 16, that is an output of the multiplier 11, is automatically shifted by one bit in the right direction by the shifter 15. This operation is performed in the step 2 in FIG. 6.

In the subsequent operation, when a carry signal is generated from the ALU12, the control circuit 17 changes the shift switching signal 79 to "1", and applies "100" to the nodes X, Y and Z, respectively. Thus, an output of the register 13 is shifted by one bit, and the shift control register 14 is incremented by 1, that is, 2 is set to the register 14. These operations are performed in the steps ⑤ and ⑥. Thereafter, the processing returns to the step ① and an output of the multiplier 11 is selected by the multiplexer 16 and is transferred to the shifter 15. At this condition, since the shift control register 14 is coupled to the shifter 16, and since 2 (that is 010) is set therein, the first, third and fifth MOS transistors are respectively turned on. Therefore, the output of the multiplier 11 is shifted by two bits, simultaneously, in the right direction and is added to a content of the register 13. According to this manner, the digital circuit of FIGS. 5 and 6 calculates the sum total.

As described above, according to the present invention, since the number of steps required for the overflow processing is only two, that is an increment of the shift control register and a shift of the register, the period necessary for performing the arithmetic is reduced by $\frac{1}{2}$ or $\frac{1}{3}$ as compared with the prior art operation.

What is claimed is:

1. A digital circuit performing an arithmetic operation comprising:
    an arithmetic logic unit having a first input end, a second input end and an output end and executing an arithmetic logic operation on two data applied to said first input end and said second input end;
    an input circuit producing a first data to be supplied to said first input end of said arithmetic logic unit as one of said two data;
    a register coupled to said output end of said arithmetic logic unit and temporarily storing a result data of the arithmetic logic operation;
    means coupled between said register and said second input end of said arithmetic logic unit for applying said result data to said second input end;
    a multiplexer circuit having two input ends coupled to said input circuit and said register and selecting one of said first data and said result data;
    a shifting circuit coupled between said multiplexer and said first input end of said arithmetic logic unit and shifting a data selected by said multiplexer to output a shifted data which is applied to said first input end of said arithmetic logic unit;
    a shift control means coupled to said shifting circuit for storing a data indicating the number of bits to be shifted which is applied to said shifting circuit; and
    a control circuit coupled to said arithmetic logic unit, said multiplexer and said shift control means for detecting that overflow occurs in the arithmetic operation and controlling said multiplexer and said shift control means such that said multiplexer selects the result data from said register and the data stored in said shift control means is increased when the overflow occurs and that said multiplexer selects said first data from said input circuit and said data stored in said shift control means is not changed when no overflow occurs in the arithmetic operation;

said shifting circuit shifting the result data by one bit to correct the overflow when said multiplexer selects said result data and shifting said first data by the number of bits indicated by the data stored in said shift control means when said multiplexer selects said first data, whereby said arithmetic logic unit performs arithmetic operation of said shifted data applied to said first input end thereof and said result data applied to said second input end thereof.

2. A digital circuit as claimed in claim 1, wherein said input circuits includes a multiplier, said first data being outputted from said multiplier.

3. A digital circuit including a multiplier and an arithmetic circuit having a first input end and a second input end and sequentially accumulating outputs of said multiplier comprising:

a register coupled to said arithmetic circuit for temporarily storing a result of said arithmetic circuit;

a multiplexer coupled to said multiplier and said register and selecting one of an output of said multiplier and said result stored in said register;

a shifter coupled to said multiplexer and shifting a selected one of said output of said multiplier and said result of said register;

a first signal line coupling said multiplexer to said first input end of said arithmetic circuit;

a second signal line coupling said register to said second input end of said arithmetic circuit;

a counter coupled to said shifter and counting the number of overflow of said arithmetic circuit; and a control circuit having first means coupled to said arithmetic circuit for receiving an overflow signal from said arithmetic circuit, second means coupled to said counter for applying a count signal to said counter when said overflow signal is received at said first means, third means coupled to said multiplexer for applying a first signal to select the result stored in said register when said overflow signal is received at said first means and for applying a second signal to select the output of said multiplier when said overflow signal is not receiver at said first means, and fourth means coupled to said shifter for applying a one-bit shift signal to said shifter when said overflow signal is received at said first means;

said shifter shifting the output of said multiplier by the number of bits indicated by a content of said counter when said output is selected and shifting the result stored in said register by one bit when said result is selected.

4. A digital circuit as claimed in claim 3, wherein a barrel-shifter is used as said shifter, said barrel-shifter having a switching circuit which selects one of said one-bit shift signal and said content of said counter.

5. A digital circuit as claimed in claim 3, wherein said arithmetic circuit executes a fixed-point arithmetic operation, said shifter shifting the output of said multiplier and the result of the accumulating operation in a direction towards a less significant bit.

6. A digital circuit comprising an arithmetic means having a first input end and a second input end for calculating two data applied to said first input end and said second input end, a storing means coupled to said arithmetic means for temporarily storing a result of the calculation, first means for applying the result of the calculation to said second input end of said arithmetic means, a selecting means having a first input portion and a second input portion for selecting one of two data applied to said first input portion and said second input portion, second means for coupling said storing means to said second input portion of said selecting means to apply the result stored in said storing means to said second input portion of said selecting means, third means coupled to said first input portion of said selecting means for applying an input data to be calculated, a shifting means coupled between said selecting means and said first input end of said arithmetic means for shifting a selected one of said input data and said result, fourth means coupled to said arithmetic means, said selecting means and said shifting means for controlling said selecting means and said shifting means such that said result is selected by said selecting means when an overflow signal of the calculation is present and is shifted by one bit by said shifting means and that said input data is selected by said selecting means when said overflow signal of the calculation is absent and is shifted by the number of bits corresponding to the number of overflows, said arithmetic means calculating a shifted input data applied to said first input end and said result applied to said second input end according to a required arithmetic operation.

* * * * *